United States Patent
Pursifull (10) Patent No.: US 8,903,630 B2
(45) Date of Patent: Dec. 2, 2014

(54) METHOD AND SYSTEM FOR ENGINE CONTROL

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 13/369,045

(22) Filed: Feb. 8, 2012

(65) Prior Publication Data

US 2012/0143480 A1 Jun. 7, 2012

(51) Int. Cl.
| | |
|---|---|
| F02D 41/22 | (2006.01) |
| F02D 41/30 | (2006.01) |
| F02D 19/00 | (2006.01) |
| F02D 19/06 | (2006.01) |
| F02D 19/08 | (2006.01) |
| F02D 41/00 | (2006.01) |

(52) U.S. Cl.
CPC ........ F02D 41/0027 (2013.01); F02D 19/0623 (2013.01); *F02D 19/0689* (2013.01); *F02D 19/084* (2013.01); *F02D 41/0025* (2013.01); F02D 19/0615 (2013.01); F02D 19/0647 (2013.01); *Y02T 10/36* (2013.01); *Y02T 10/40* (2013.01); *F02D 2200/0602* (2013.01); F02D 19/0628 (2013.01); F02D 41/221 (2013.01); F02D 19/0694 (2013.01)
USPC ........... 701/105; 701/107; 123/431; 123/525; 123/575; 123/457

(58) Field of Classification Search
CPC . F02D 41/22; F02D 41/0025; F02D 19/0623; F02D 19/0694; F02D 19/0647; F02D 19/0628; F02D 19/0615
USPC ......... 123/27 GE, 525, 431, 575, 198 A, 299, 123/300, 456, 457, 510, 511, 529; 701/103, 701/104, 105, 107
See application file for complete search history.

(56) References Cited

U.S. PATENT DOCUMENTS

| | | | |
|---|---|---|---|
| 5,483,943 | A | 1/1996 | Peters |
| 5,615,702 | A | 4/1997 | Dawans et al. |
| 5,632,250 | A | 5/1997 | Kato et al. |
| 6,145,494 | A | 11/2000 | Klopp |
| 6,240,910 | B1 | 6/2001 | Maekawa et al. |
| 6,390,075 | B1 | 5/2002 | Yamazaki et al. |

(Continued)

FOREIGN PATENT DOCUMENTS

GB 2345729 A 7/2000

OTHER PUBLICATIONS

Ulrey, Joseph Norman et al., "System and Method for Emptying a Tank," U.S. Appl. No. 13/431,295, filed Mar. 27, 2012, 33 pages.

(Continued)

*Primary Examiner* — Hai Huynh
(74) *Attorney, Agent, or Firm* — Julia Voutyras; Alleman Hall McCoy Russell & Tuttle LLP (57) ABSTRACT

Methods and systems are provided for fuel systems including a gaseous fuel. Temporary flow restrictions in the fuel line of a first gaseous fuel may be addressed by temporarily shifting to cylinder operation with a second liquid fuel. Upon resumption of first fuel operation, if the flow restriction persists, a diagnostic code may be set and cylinder operation with the second fuel may be restarted.

14 Claims, 4 Drawing Sheets

(56) References Cited

U.S. PATENT DOCUMENTS

| | | |
|---|---|---|
| 6,708,718 B2 | 3/2004 | Yamada et al. |
| 7,325,561 B2 | 2/2008 | Mathison et al. |
| 7,367,312 B1 | 5/2008 | Boyer et al. |
| 8,534,263 B2 * | 9/2013 | Marriott et al. ............... 123/299 |
| 2004/0139944 A1 | 7/2004 | Nakano et al. |
| 2004/0144371 A1 | 7/2004 | Jauss |
| 2006/0246177 A1 | 11/2006 | Miki et al. |
| 2007/0000563 A1 | 1/2007 | Handa |
| 2009/0055077 A1 | 2/2009 | Schule |
| 2010/0307454 A1 | 12/2010 | Ulrey et al. |
| 2014/0026868 A1 * | 1/2014 | Dolan et al. ................. 123/525 |

OTHER PUBLICATIONS

Pursifull, Ross D., "Method and System for Engine Control," U.S. Appl. No. 13/369,052, filed Feb. 8, 2012, 31 pages.

* cited by examiner

METHOD AND SYSTEM FOR ENGINE CONTROL

FIELD

The present application relates to adjusting engine operation in a bi-fuel vehicle using compressed natural gas.

BACKGROUND/SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as a gas in cylinders at high pressure. A pressure regulating valve may then be used to supply the compressed natural gas (CNG) at lower pressures to an engine combustion chamber. Various engine systems may be used with CNG fuels, utilizing various engine technologies and injection technologies that are adapted to the specific physical and chemical properties of CNG fuels. For example, mono-fuel engine systems may be configured to operate only with CNG while multi-fuel systems may be configured to operate with CNG and one or more alternate fuels, such as gasoline or gasoline blend liquid fuels. Therein, the engine may be preferentially operated on CNG to reduce gasoline consumption, while turning to gasoline usage when CNG is unavailable.

However, the inventors herein have recognized a potential issue with such systems. There may be conditions when there is sufficient fuel in the CNG fuel tank but insufficient fuel rail pressure in the CNG fuel line. These conditions may arise, for example, due to a flow restriction in the CNG fuel line as caused by a fuel line freeze up (due to excessive water vapor content in the gaseous fuel leading to ice blockage), plugging of a tank coalescing filter (due to compressor oil filling the filter), the presence of a kink or plug in the fuel line, etc. In response to any of these conditions, the CNG tank may be effectively treated as empty and accordingly mitigating actions may be taken. For example, in mono-fuel systems, an aircharge to the engine may be limited, so as to limit engine power. As another example, in multi-fuel systems, engine operations may be switched to the use of the alternate fuel. For example, in the example bi-fuel system discussed above, engine operations may be shifted to the gasoline fuel. In either case, the result is an inefficient use of CNG, since any remaining CNG in the fuel tank is not being used to operate the engine and propel the vehicle. In addition, the switch to gasoline usage degrades the fuel economy of the vehicle.

The inventors herein have further realized that at least some of the above-mentioned conditions that lead to a drop in CNG fuel rail pressure may be temporary in nature and/or may not be resolved by repair. For example, a flow restriction caused by ice build-up in the fuel-line (e.g., due to high humidity fuel and/or low ambient temperatures) may resolve itself once the ice has melted. In comparison, other conditions may be of a more persistent nature and may require repair and maintenance work. Thus, mitigating actions may vary for different flow restrictions.

In one example, some of the above issues may be at least partly addressed by a method of operating an engine comprising alternating fuel injection to one or more engine cylinders between a first, gaseous fuel from a first fuel tank and a second, liquid fuel from a second fuel tank responsive to each of a first fuel rail pressure and a first fuel tank pressure of the first fuel. In this way, a drop in fuel rail pressure resulting from a temporary flow restriction in the CNG fuel line may be better identified, and CNG usage may be resumed when the flow restriction has cleared.

For example, an engine may be configured to operate on a first gaseous fuel, such as CNG and a second liquid fuel, such as gasoline. In response to a drop in CNG fuel line rail pressure below a threshold pressure, while the CNG fuel tank is sufficiently full, an engine control system may infer a fault (e.g., flow restriction) in the CNG flow delivery system and may immediately switch operation of one or more engine cylinders to the gasoline fuel. After operating on gasoline for a duration, the control system may resume operation of the cylinders with CNG. As one example, the switching may include operating some engine cylinders with CNG while operating the remaining engine cylinders with gasoline fuel for the duration. As another example, the switching may include operating a given cylinder with at least some CNG and at least some gasoline fuel for a number of combustion events.

In one example, the duration for which the cylinders are operated with gasoline fuel may correspond to a duration required to melt and clear a potential ice blockage from the CNG fuel line, under the current ambient temperature conditions. Consequently, a temporary flow restriction due to a fuel freezing condition may be overcome after the duration. If upon return to CNG operation of the cylinders, the CNG fuel rail pressure has returned to or above the threshold pressure, without a fuel tank refilling event occurring in the interim, it may be determined that the underlying flow restriction was temporary in nature (and has since cleared). However, if after the duration, the fuel rail pressure remains insufficient, a more persistent restriction in the CNG fuel line may be determined (e.g., due to a filter plugging condition), and gasoline injection to the engine cylinders may be continued. In addition, based on the nature of the restriction, an appropriate diagnostic code may be set.

In an alternate embodiment, where CNG is the only fuel available in the engine's fuel system, in response to the drop in fuel rail pressure, an airflow to the engine may be temporarily limited for the duration. If the fuel rail pressure returns after the duration, injection of CNG may be resumed. However, if the fuel rail pressure does not return after the duration, the airflow may be further limited and an appropriate diagnostic code may be set.

By performing a mitigating action for a specified duration, temporary flow restrictions in a fuel line may be overcome. By alternating injection of a gasoline fuel with CNG fuel over a duration based on a CNG rail pressure, temporary flow restrictions in the CNG fuel line may be better differentiated from permanent flow restrictions, and accordingly addressed. Specifically, by resuming CNG usage after the temporary flow restriction has been overcome, CNG usage may be increased, gasoline usage may be decreased, and vehicle fuel economy can be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
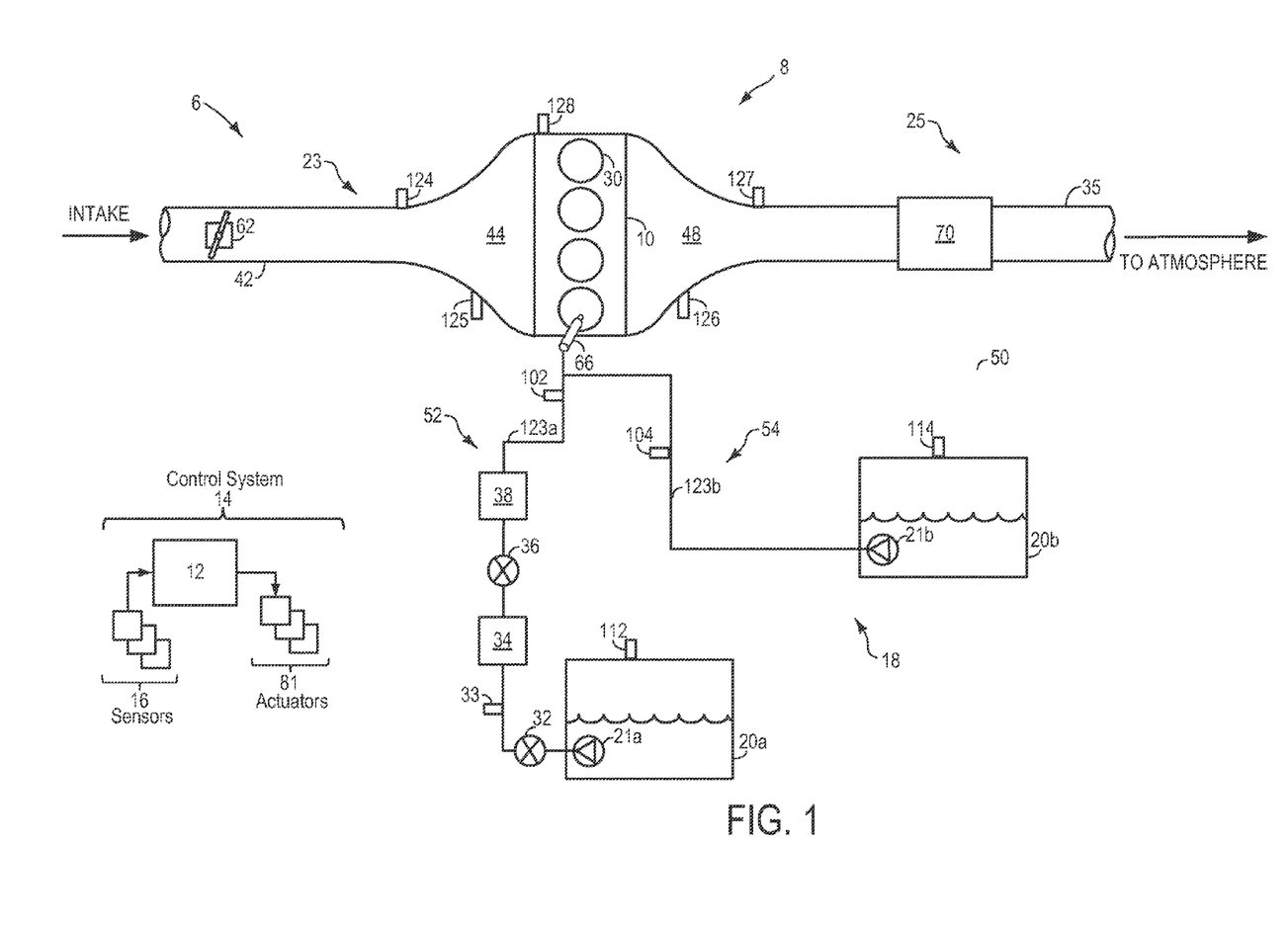
FIG. 1 shows a schematic depiction of an engine system configured to operate on one or more fuels of differing chemical and/or physical properties.

Methods and systems are provided for increasing use of alternate fuels in a mono- or multi-fuel engine system, such as the system of FIG. 1, by better distinguishing and addressing temporary and permanent fuel line flow restrictions. A controller may be configured to perform a mitigating action responsive to a flow restriction in the fuel line of a gaseous fuel for a duration before resuming regular engine operation with the fuel. For example, the controller may perform a control routine, such as those described in FIGS. 2-3, to shift cylinder operation from a first fuel to a second fuel for a duration, in response to a drop in fuel rail pressure of the primary fuel, when the fuel tanks are sufficiently full and despite the vehicle operator's indicated preference for the first fuel. Based on the change in fuel rail pressure upon resumption of cylinder operation with the first fuel, it may be determined whether the flow restriction was temporary or permanent. Accordingly, appropriate mitigating actions may be taken and diagnostic codes may be issued. Alternatively, in a mono-fuel engine system, an airflow to the engine may be temporarily limited. An example adjustment in a multi-fuel system is described herein with reference to FIG. 4.

FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere upon passage through an emission control device 70. It will be appreciated that other components may be included in the engine such as a variety of valves and sensors.

Fuel system 18 may include one or more fuel tanks. In the depicted example, the fuel system is a multi-fuel system including a first fuel tank 20a configured to deliver a first fuel having a first chemical and physical property along a first fuel line 52. Fuel system 18 may further include a second fuel tank 20b configured to deliver a second fuel having a second, different chemical and physical property along a second fuel line 54. Various fuel system components, such as various valves, pressure regulators, filters, and sensors, may be coupled along each of first fuel line 52 and second fuel line 54. Fuel tanks 20a, 20b may hold a plurality of fuel or fuel blends. For example, the first fuel may be a first gaseous fuel, such as compressed natural gas (CNG) or liquefied petroleum gas (LPS) while the second fuel may be a second liquid fuel, such as gasoline, fuel with a range of alcohol concentrations, various gasoline-ethanol fuel blends (e.g., E10, E85), and combinations thereof.

Each fuel tank may be coupled to respective fuel pumps for pressurizing fuel delivered to the injectors of engine 10, such as example injector 66. While only a single injector 66 is depicted, additional injectors are provided for each cylinder 30. The first fuel stored in first fuel tank 20a may be delivered to an injector 66 of engine cylinder 30 via a first fuel rail 123a while the second fuel in second fuel tank 20b may be delivered to the injector of engine cylinder 30 via a second fuel rail 123b. In one example, where fuel system 18 includes a direct injection system, injector 66 may be configured as a direct fuel injector. In an alternate embodiment, fuel system 18 may include a port injection system wherein injector 66 may be configured as a port fuel injector. In still other embodiments, each cylinder may include one or more injectors including a direct injector and a port injector. The fuel system may further include one or more valves (not shown) to regulate the supply of fuel from fuel tanks 20a, 20b to the injector 66.

Direct injection provides multiple advantages during high load conditions. For example, introducing oxygenated, liquid fuels with direct injection and high heat of vaporization at high load provides charge cooling for increased air charge, dilution for combustion temperature control, and knock resistance. On the other hand, port injection may provide advantages during low load conditions. For example, introducing high volatility fuels by intake injection at low load may provide enhanced startability, particulate emission reduction, and less unvaporized fuel. By utilizing either direct or port injection over various areas of the speed-load map, the benefits provided by both systems may be maximized.

In the depicted example, first fuel line 52, and related components, may be configured to deliver a first gaseous fuel to the engine cylinders, while second fuel line 54, and related components, may be configured to deliver a second liquid fuel to the engine cylinders. Accordingly, first fuel tank 20a may be coupled to a pressure regulator 34 and a solenoid valve 36 to enable a fixed low pressure supply of the first fuel to be provided to injector 66. A tank valve 32 (e.g., a check valve) may be positioned between first fuel tank 20a and pressure regulator 34 to ensure correct flow of fuel from the fuel tank. A tank output line pressure sensor 33 may be positioned upstream of pressure regulator 34 and downstream of first fuel tank 20a to provide an estimate of fuel pressure before pressure regulation by the pressure regulator 34. That is, pressure sensor 33 may provide an estimate of fuel pressure input on the higher pressure side of pressure regulator 34. A coalescing filter 38 may be positioned on the lower pressure side of pressure regulator 34. Solenoid valve 36, also referred to as a lock-off valve, may be coupled between pressure regulator 34 and coalescing filter 38.

In one example, first fuel tank 20a may store the first gaseous fuel in a pressure range of 10-700 bar (e.g., 0-100+ psi for LNG fuel, 500 psi for ANG fuel, 3000-6000 psi for CNG fuel, and 5000-10,000 psi for hydrogen fuel) while pressure regulator 34 may regulate the fuel rail pressure to a fixed range of 10-40 bar (e.g., 2-10 bar for CNG fuel). A further check valve (not shown) may be coupled downstream of pressure regulator 34 and upstream of fuel injector 66. As such fuel system 18 may be a return-less fuel system, a return fuel system, or various other types of fuel system. It will be appreciated that while the embodiment shows fuel system 18 as a bi-fuel system, in alternate embodiments, fuel system 18 may be a mono-fuel system wherein engine 10 is configured to operate on with gaseous fuel from fuel tank 20a.

During some conditions, a flow restriction may occur in first fuel line 52 delivering the first fuel. These flow restrictions may be temporary or persistent in nature. As an example, intermittent flow restrictions may occur due to freezing of the first fuel line. As such, the first fuel line may freeze up due to icing of water at low ambient temperatures, the water originating from an excessive water vapor content (high humidity) of the first fuel. However, icing may also occur under high fuel flow conditions when the first fuel is more humid that a specified limit. As another example, persistent flow restrictions in first fuel line 52 may occur due to a kink or plug in the fuel line. As such, wherever the gaseous fuel expands from a high pressure to a low pressure (due to any restriction), that region of the fuel line becomes very cold. Consequently, ice forms and potentially adheres at that point. As another example, a persistent flow restriction may arise due to compressor oil filling and plugging the coalescing filter 38. Irrespective of the nature of the flow restriction, a fuel rail pressure of the first fuel may drop in response to the fuel line restriction. An engine control system may perceive the drop in fuel rail pressure as an indication that the first fuel tank is empty, or not sufficiently full. In response to the drop in fuel rail pressure, the control system may perform an appropriate mitigating action. As an example, in multi-fuel systems, where an alternate (second) fuel is available, the control system may shift a cylinder fuel injection from the first fuel to the second fuel. As another example, in mono-fuel systems, where only the first fuel is available, the control system may limit airflow (or aircharge) to the engine to reduce an engine power.

The inventors herein have recognized that temporary flow restrictions in the first fuel line, and the consequent drop in first fuel rail pressure may only last for a duration, and following that duration, fuel rail pressure may rise if the flow restriction is no longer present. For example, where the flow restriction is due to fuel line freezing, following a duration that is based at least on the ambient temperature condition, the duration being sufficiently long to allow some or all of the ice to melt, the flow restriction may not persist and the fuel rail pressure may return to the higher level. At this time, injection of the first fuel can be resumed to reduce prolonged usage of the second fuel or prolonged limiting of engine aircharge (and power). If the vehicle operator has already indicated a usage preference for the first fuel over the second fuel, this also allows the operator's driving experience to be improved. However, if the flow restriction and the consequent drop in first fuel rail pressure persist, injection of the second fuel (or limiting of the airflow) can be continued until the restriction is addressed.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include MAP and MAF sensors 124 and 125 in the intake, exhaust gas sensor 126 and temperature sensor 127 located in the exhaust, pressure sensors 102, 104 coupled to first and second fuel rails respectively and configured to provide an estimate of the respective fuel rail pressures, pressure sensors 112, 114 coupled to first and second fuel tanks respectively and configured to provide an estimate of the respective fuel tank pressures, etc. Other sensors such as pressure, temperature, fuel level, air/fuel ratio, and composition sensors may be coupled to various locations in the vehicle system 6. As another example, the actuators may include fuel pumps (21a and 21b), fuel injector 66, solenoid valve 34, pressure regulator 34, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2-3.

In this way, the system of FIG. 1 enables a method of operating engine 10 coupled to fuel system 18 wherein in response to a fuel rail pressure of the gaseous fuel falling below a threshold rail pressure while a fuel tank pressure of the gaseous fuel is above a threshold tank pressure, a mitigating action is performed for a duration, and after the duration, regular engine operation is resumed with the gaseous fuel.

Figure 2:
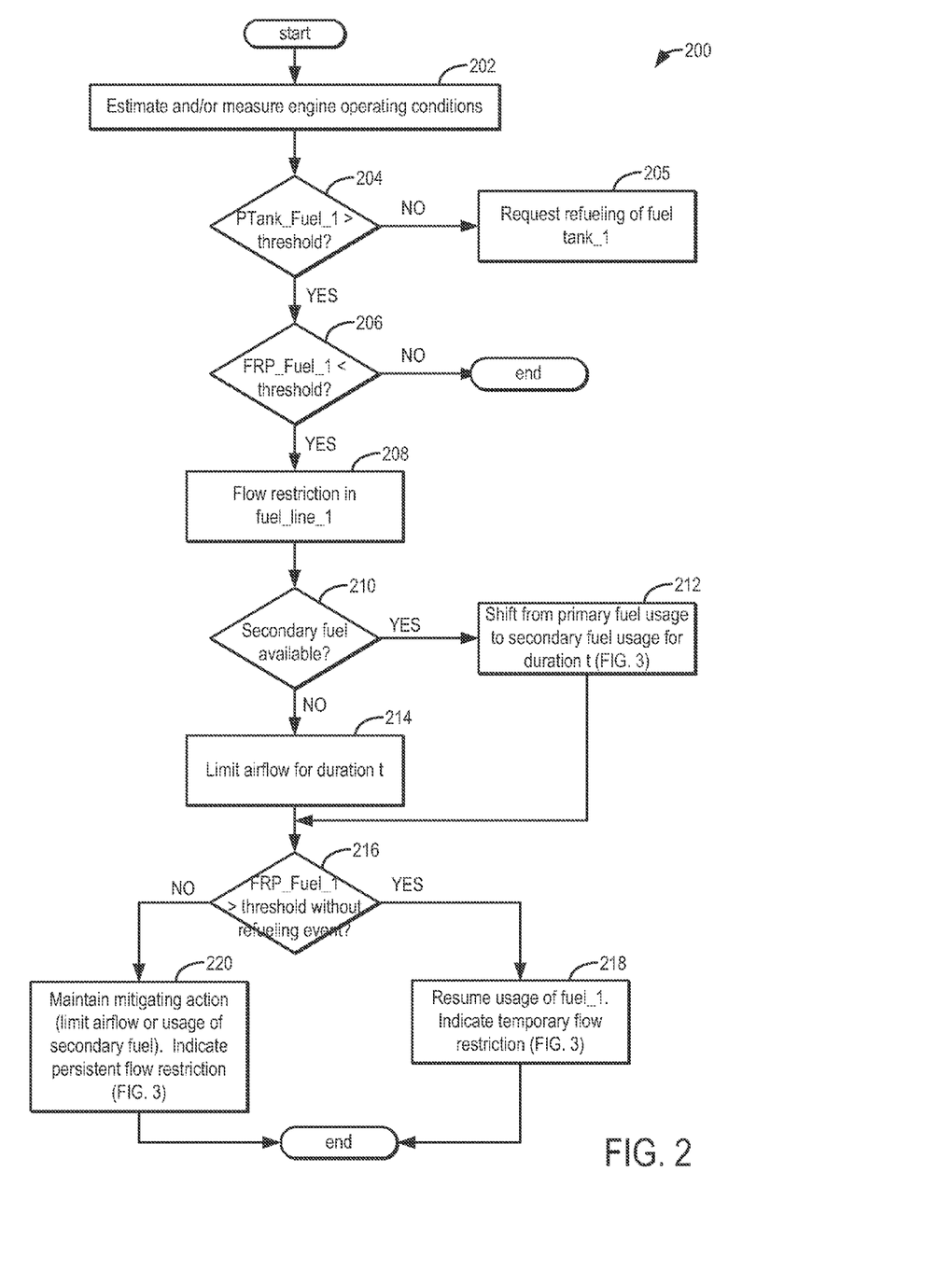
FIG. 2 shows an example flowchart for performing a mitigating action responsive to a flow restriction in a gaseous fuel line.

Now turning to FIG. 2, an example method 200 of temporarily performing a mitigating action in response to a drop in fuel rail pressure while a fuel tank pressure remains sufficiently high is elaborated. As such, the routine of FIG. 2 enables a flow restriction to be better distinguished from a situation where the fuel tank is not sufficiently full.

At 202, the method includes estimating and/or measuring engine operating conditions. These may include, for example, engine speed, torque demand, ambient conditions (e.g., temperature, pressure, humidity, etc.), engine temperature, fuel level in each fuel tank, etc. At 204, it may be determined if the fuel tank pressure of the first gaseous fuel is above a threshold tank pressure. Herein, the first gaseous fuel may be a primary fuel selected by the driver. That is, the driver may have indicated a preference for usage of the first gaseous fuel over the second liquid fuel. If the fuel tank pressure of the first gaseous fuel is not above the threshold tank pressure, then at 205, it may be determined that the fuel tank storing the first fuel is not sufficiently full and a refueling request may be made.

Upon confirming that the first fuel tank is sufficiently full, at 206, it may be determined if the fuel rail pressure of the first fuel rail is lower than a threshold rail pressure. If not, the routine may end. If yes, then at 208, in response to the fuel rail pressure of the gaseous fuel falling below the threshold rail pressure while the fuel tank pressure of the gaseous fuel is above the threshold tank pressure, a flow restriction in the fuel supply, or fuel line, of the first gaseous fuel may be determined.

In response to the flow restriction, a mitigating action may be performed. The mitigating action may vary based on the availability of a secondary fuel other than the primary gaseous fuel. Typically a restricted fuel line may be able to maintain a sufficient fuel rail pressure up to a given threshold fuel flow rate. Thus, while the engine is operating within that threshold fuel flow rate, usage of a secondary fuel would not be necessarily required. However, for a large fuel flow rate, the gaseous fuel pressure of the primary fuel may not be maintained and the primary fuel would have to be supplemented or engine air flow rate would have to be limited.

Based on the nature of the fuel system, a controller may perform the mitigating action for a duration. Then, after the duration, engine operation may be resumed with the gaseous fuel. In particular, at 210, it may be determined if a secondary fuel is available for usage. In one example, wherein the fuel system is a mono-fuel system that includes only the first gaseous fuel, it may be determined that no secondary fuel is available, and accordingly at 214, the mitigating action may include limiting an aircharge delivered to the engine for the specified duration. Limiting the aircharge may include, for example, adjusting a throttle position, adjusting a cylinder valve operation (e.g., valve timing, overlap, duration of opening, etc. for an intake and/or an exhaust valve of the cylinder).

In some embodiments of mono-fuel systems, the mitigating action selected may be based on the nature of the gaseous fuel (e.g., based on whether the gaseous fuel is CNG or LPG). The mitigating action may be further based on the potential cause of the low fuel rail pressure (such as in embodiments wherein the cause of the low fuel rail pressure may be deduced from the sensed tank pressure and rail pressure).

In one example, where the mono-fuel system uses CNG as the gaseous fuel, potential causes for the low fuel rail pressure other than fuel line freeze-up may include tank valve issues, low tank pressure, incorrect setting of an excess flow valve of the fuel system, a kinked line, plugged high pressure filter, plugged low pressure filter, degraded tank valve solenoid, degraded pressure regulator solenoid, degraded regulator, etc. In response to most of the above-mentioned causes, the mitigating action used may be to limit the air flow rate to thereby limit power output. In another example, when the cause is an inadvertently tripped excess flow valve, the tank valve may be shut off and the engine may be restarted. As such, the excess flow valve may be a valve that is configured to be automatically reset. Herein, forcing the flow rate to zero (no flow) resets the excess flow valve, and may address the issue.

In another example, where the mono-fuel system uses LPG as the gaseous fuel, in particular, LPG systems that inject gaseous LPG and not liquid LPG, there may be reasons in addition to those cited above that lead to a low fuel rail pressure. For example, operation of the vaporizer that converts liquid fuel from the fuel tank to vapor for injection (using heat from the engine coolant) may be limited in cold ambient weather, leading to lower fuel rail pressures.

Returning to 214, In another example, wherein the fuel system is a multi-fuel (e.g., bi-fuel) system that includes a second liquid fuel in addition to the first gaseous fuel, it may be determined that a secondary fuel is available, and accordingly at 216, the mitigating action may include operating the engine with the secondary fuel for the duration. In particular, engine operation may be shifted partially or wholly to the secondary fuel.

Figure 3:
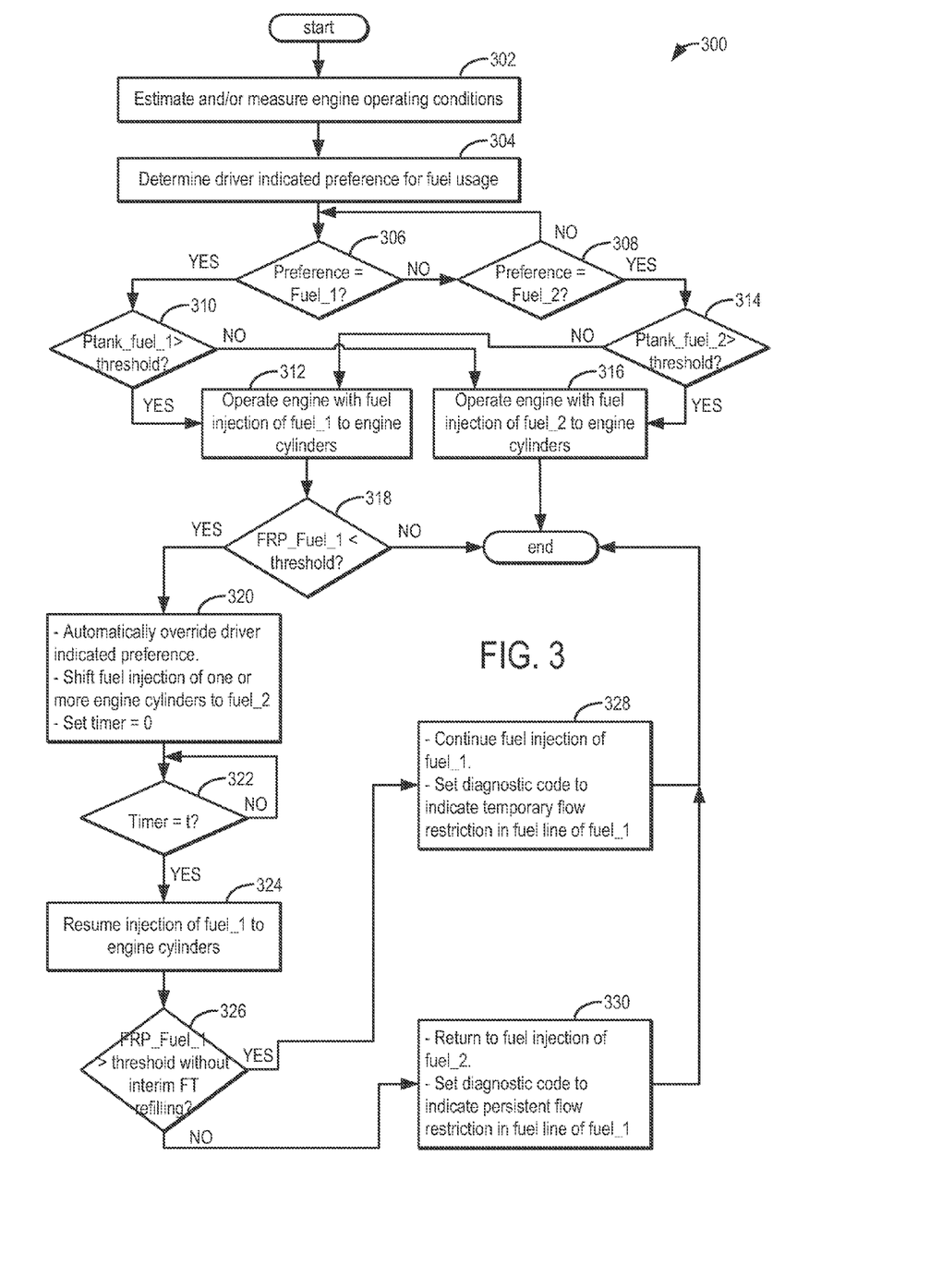
FIG. 3 shows an example flowchart for alternating cylinder fuel injection between a first and a second fuel based on a fuel rail pressure and a fuel tank pressure of fuels in the fuel system.

As elaborated with reference to the example method for a multi-fuel system in FIG. 3, a number of cylinders wherein fuel injection is temporarily shifted from the first fuel to the second fuel, and/or a proportion of the second fuel relative to the first fuel in a fuel injection to a given cylinder (in a given cylinder combustion event), may be based on the availability of the secondary fuel. For example, the number of cylinders and/or the proportion of secondary fuel may be increased as the fuel tank pressure (or fuel rail pressure) of the second fuel tank (or second fuel rail) exceeds a threshold tank pressure (or threshold fuel rail pressure). That is, if more secondary fuel is available, a larger number of cylinders, and/or a larger proportion of a fuel injection to any given engine cylinder may be shifted to the secondary fuel at least until the fuel rail pressure of the primary gaseous fuel is returned above limits.

The specified duration (t) over which the mitigating action (fuel usage shifting or aircharge limiting) may be based at least on ambient temperature conditions and may be a duration over which a temporary flow restriction (e.g., due to an ice blockage) may be resolved. In one example, a flag indicating a possible ice blockage may be set and maintained until the ambient temperature is above freezing for 1000 Farenheight-minutes (e.g., 50 F above freezing for 20 minutes or 2 F above freezing for 500 minutes). This condition may not be met for days, weeks, or months, and if so, the possible ice blockage flag may be maintained so as not to indicate or confirm a permanent blockage until the thaw period has been experienced. The reason for this is that there is no part that can be replaced to resolve an icing situation. Rather, to address an icing situation, the gaseous fuel tank needs to be re-fueled with fuel that is properly dried. However, the control system may continue to poll the gaseous fuel branch of the vehicle's fuel system to assess its ability to meet the pressure requirement at a given flow rate.

At 216, after the duration t has elapsed, the fuel rail pressure of the first fuel may be re-estimated and it may be determined if the fuel rail pressure has risen to or above the threshold fuel rail pressure without a refueling event in the interim. That is, it may be determined if there has been a rise in the fuel rail pressure of the first fuel tank without a refilling of the first fuel tank. As such, if the prior drop in fuel rail pressure of the first fuel was due to a temporary flow restriction in the first fuel line, the restriction may have resolved itself over the duration and may not need further repair or maintenance work. However, if the prior drop in fuel rail pressure of the first fuel was due to a more persistent flow restriction in the first fuel line, the restriction (and consequent drop in fuel rail pressure) may persist even after the duration. In addition, repair or maintenance work (e.g., fuel system component replacement) may be required to address the issue.

At 218, in response to the fuel rail pressure of the gaseous fuel being above the threshold rail pressure after the duration, while the fuel tank pressure of the gaseous fuel is above the threshold tank pressure without a refueling event, the method includes resuming engine operation with the gaseous fuel and maintaining injection of the first fuel. If the engine aircharge was previously limited, the limiting may also be stopped. That is, the mitigating action performed responsive to the flow restriction may be discontinued. In addition, a temporary flow restriction in the fuel line of the gaseous fuel may be indicated. For example, a first diagnostic code (e.g., "low pressure fuel system pressure—too low, low ambient temperature") may be set.

In comparison, at 220, in response to the fuel rail pressure of the gaseous fuel remaining below the threshold rail pressure after the duration, while the fuel tank pressure of the gaseous fuel is above the threshold tank pressure without a refueling event, the method includes resuming engine resuming injection of the second fuel. Alternatively, if the engine aircharge was previously being limited, the limiting may be resumed and maintained, or further increased. That is, the mitigating action performed responsive to the flow restriction may be continued. As elaborated with reference to FIG. 3, this includes resuming injection of the second fuel to one or more engine cylinders, or increasing the proportion of second fuel relative to first fuel in the fuel injection to a given engine cylinder. In addition, a persistent flow restriction in the fuel line of the gaseous fuel may be indicated. For example, a second diagnostic code (e.g., "low fuel pressure—forced limited power") may be set.

As such, the algorithm applied in the method of FIG. 2 (and FIG. 3) recognizes that a loss of pressure from a fuel tank storing a gaseous fuel (such as CNG) is different from a loss in the ability to pump a liquid fuel stored in a fuel tank. By recognizing the differences between the pressure regulation of a gaseous fuel from a fuel tank coupled to a pressure regulator relative to the pressure regulation temporary flow restriction in the fuel line of the gaseous fuel may be better differentiated from a persistent flow restriction therein that may require repair and part replacement to resolve the issue.

Now turning to FIG. 3, an example method 300 is shown for alternating fuel injection to one or more engine cylinders between a first, gaseous fuel from a first fuel tank and a second, liquid fuel from a second fuel tank responsive to a fuel rail pressure and a fuel tank pressure of the fuels. As such, the method of FIG. 3 is a more detailed depiction of the method of FIG. 2 with reference to a bi-fuel system.

At 302, the method includes estimating and/or measuring engine operating conditions. These may include, for example, engine speed, torque demand, ambient conditions (e.g., temperature, pressure, humidity, etc.), engine temperature, fuel level in each fuel tank, etc. At 304, a driver indicated preference for fuel usage may be determined. For example, it may be determined whether the driver has indicated a preference for usage of the first fuel or the second fuel (assuming both fuels are available). In one example, the driver may select a preference (e.g., for the first fuel over the second fuel) via a selection button on the vehicle dashboard. In another example, the driver preference may be preset (e.g., for a first gaseous fuel over a second liquid fuel. Alternatively, the driver selection may indicate a preference for non-usage of a particular fuel whereby the driver may indicate that the particular fuel (e.g., a liquid gasoline fuel) is to be used only when necessary.

At 306, it may be determined if the driver indicated preference is for injection of the first fuel (fuel_1). If yes, then at 310, it may be determined if a (first) tank pressure of the first fuel tank is above a threshold pressure. That is, it may be determined if the first fuel tank is sufficiently full. In an alternate embodiment, the output of a fuel level sensor coupled to the first fuel tank may be used to determine if the first fuel tank is sufficiently full. If the tank is sufficiently full, then at 312, the engine may be operated with fuel injection of the first fuel to the engine cylinders. In the depicted example, the first fuel may be a CNG fuel, and accordingly, the CNG fuel may be injected in the engine cylinders. However, if the first fuel tank is not sufficiently full, then the method may move to 316 to operate the engine with fuel injection of the second fuel.

If the driver indicated preference for the first fuel is not confirmed at 306, then at 308, it may be determined if the driver indicated preference is for injection of the second fuel (fuel_2). If yes, then at 314, it may be determined if a (second) tank pressure of the second fuel tank is above a threshold pressure. That is, it may be determined if the second fuel tank is sufficiently full. In an alternate embodiment, the output of a fuel level sensor coupled to the second fuel tank may be used to determine if the second fuel tank is sufficiently full. If the tank is sufficiently full, then at 316, the engine may be operated with fuel injection of the second fuel to the engine cylinders. In the depicted example, the second fuel may be a gasoline fuel, and accordingly, the gasoline fuel may be injected in the engine cylinders. However, if the second fuel tank is not sufficiently full, then the method may move to 312 to operate the engine with fuel injection of the first fuel.

As such, operation of the engine with the first fuel may be continued until a drop in (first) fuel rail pressure of the first fuel rail is observed. In particular, at 318, it may be determined if the first fuel rail is below a (first) threshold. As such, a drop in fuel rail pressure may indicate that the corresponding fuel tank is not sufficiently full. However, if there is a drop in fuel rail pressure while the fuel tank pressure indicates that the fuel tank is sufficiently full, the controller may be configured to infer that there is a flow restriction in the fuel line.

Thus, at 320, in response to a drop in first fuel rail pressure, while the first tank pressure remains above a threshold pressure (that is, while the first tank is sufficiently full), fuel injection may be alternated between the first fuel and the second fuel. Specifically, at 320, the method includes automatically switching to injecting the second fuel to one or more engine cylinders for a duration. Herein, injecting the second fuel includes, at least temporarily, automatically overriding the driver indicated preference for injection of the first fuel. In addition, a timer may be started. The number of cylinders wherein fuel injection is switched from the first fuel to the second fuel may based on the fuel tank pressure of the first fuel and/or the fuel tank pressure of the second fuel. For example, if the fuel tank pressure of the second fuel is above a threshold, (that is, the second fuel tank is more full), then the switching of fuel injection from the first fuel to the second fuel may be enabled on a larger number of engine cylinders. However, if the fuel tank pressure of the second fuel is below the threshold, (that is, the second fuel tank is less full), then the switching of fuel injection from the first fuel to the second fuel may be enabled on a smaller number of engine cylinders.

In still further embodiments, the controller may temporarily increase a proportion of the second fuel relative to the first fuel in the fuel injection to the engine cylinders responsive to the pressure of the first fuel rail being lower than a first threshold. The proportion may the second fuel relative to the first fuel in the fuel injection may be adjusted based on a pressure of the second fuel rail, the proportion being higher when the second fuel rail is above the second threshold, and the proportion being lower when the second fuel rail is below the second threshold. That is, as the availability of the second fuel increases while there is a flow restriction in the first fuel line, the proportion of second fuel in the fuel injection may be increased.

The duration (t) of second fuel injection may correspond to a duration required to overcome a temporary flow restriction, for example a duration required to melt ice (causing an ice blockage in the fuel line) at a prevalent ambient condition, such as an ambient temperature. At 322, it may be confirmed if the duration (t) has elapsed. At 324, after the duration has elapsed, the method includes resuming injection of the first fuel to the one or more engine cylinders. At 326, it may be determined if the first fuel rail pressure has returned above the first threshold without the first fuel tank being refilled in the interim. Specifically, it may be determined if there is a rise in fuel rail pressure after the duration that is not due to a refilling of the fuel tank over the duration. As such, if the prior drop in first fuel rail pressure was due to a temporary flow restriction in the first fuel line, it may have resolved over the duration. For example, a temporary flow restriction due to fuel line freezing may have been overcome due to the ice melting over the duration. As a result, the first fuel rail pressure may have returned to levels above the first threshold if no refilling of the first fuel tank occurs over the duration.

At 328, in response to the first fuel rail pressure being above the threshold after the duration, the method includes maintaining injection of the first fuel. In addition, the controller may indicate a temporary flow restriction in the first fuel line via a first diagnostic code. In comparison, at 330, in response to the first fuel rail pressure remaining below the threshold after the duration, the method includes resuming injection of the second fuel. In addition, the controller may indicate a persistent flow restriction in the first fuel line via a second, different diagnostic code.

In an alternate embodiment, wherein a proportion of the second fuel relative to the first fuel in the fuel injection is increased in response to the flow restriction in the first fuel line, the controller may reduce the proportion of the second fuel relative to the first fuel after the duration if the first fuel rail pressure is above the first threshold (at 328). Alternatively, the controller may maintain or further increase the proportion of the second fuel relative to the first fuel in the fuel injection after the duration if the first fuel rail pressure remains below the first threshold.

In this way, fuel injection to one or more engine cylinders may be alternated between the first fuel and the second fuel responsive to each of the first fuel rail pressure and the first fuel tank pressure of the first fuel. In addition, the alternating may be further responsive to the second fuel rail pressure and the second fuel tank pressure of the second fuel.

Figure 4:
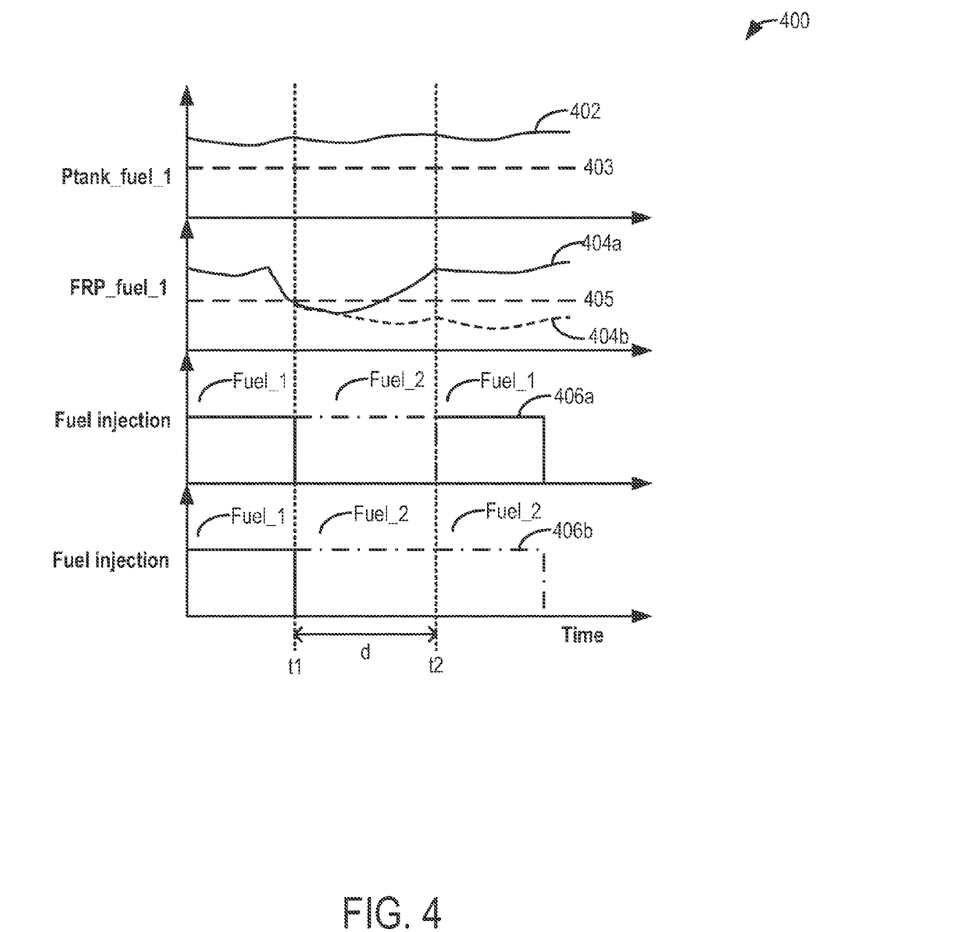
FIG. 4 shows an example fuel usage adjustment between the first fuel and the second fuel in response to various flow restrictions in the fuel line of the first fuel.

Now turning to FIG. 4, map 400 illustrates example fuel adjustments as per the routine of FIGS. 2-3. In particular, map 400 depicts a first tank pressure of a first fuel tank storing a first gaseous fuel at 402, changes to a first fuel rail pressure of a first fuel rail delivering the first fuel at 404a and 404b, and corresponding changes to a fuel injection to an engine cylinder at 406a and 406b.

Before t1, the first fuel tank may be sufficiently full, as indicated by the fuel tank pressure of the first fuel tank (Ptank_ fuel_1) being higher than a threshold tank pressure 403. While not shown, at the same time, the second fuel tank may also be sufficiently full, and the fuel tank pressure of the second may be higher than a corresponding threshold tank pressure. N the depicted example, the driver may have indicated a preference for usage of the first fuel and accordingly the first fuel may be preferentially injected into the engine cylinder (406a and 406b, solid line). At t1, the first fuel rail pressure of the first fuel rail may drop below a first threshold rail pressure 405 while the first fuel tank pressure remains above the threshold 303. While pressure in first fuel tank is above the threshold pressure and while the first fuel tank is not refilled, an engine controller may shift from injecting only the first fuel to injecting (at least some of) the second fuel to one or more engine cylinder responsive to the drop in first fuel rail pressure below a first threshold pressure (406a and 406b, dashed and dotted line). During the shifting, the driver indicated fuel preference for the first fuel is automatically overridden.

The shifting may be performed for a duration d (between t1 and t2) that is based on ambient conditions, in particular, ambient temperature conditions. In one example, shown by solid line 404a, at t2, after the duration d has elapsed, in response to the first fuel rail pressure returning to being higher than the threshold pressure 405, a controller may resume injection of the first fuel into the one or more engine cylinders (406a, solid line). In an alternate example, shown by dashed line 404b, in response to the first fuel rail pressure remaining lower than the first threshold pressure 405, the controller may maintain injection of (at least some of) the second fuel into the one or more engine cylinders (406b, dashed and dotted line).

It will be appreciated that the number of engine cylinders wherein the switching of fuel injection between the first and second fuels is performed may be based on the availability of the second fuel (as judged by a fuel level or tank pressure of the second fuel tank, for example). Thus, at higher fuel tank pressures of the second fuel tank, a larger number of cylinders may be switched from injection of first fuel to injection of second fuel, while at lower fuel tank pressures of the second fuel tank, a smaller number of cylinders may be switched from injection of first fuel to injection of second fuel.

Further, while the depicted examples illustrate switching between usage of only the first fuel and the second fuel, it will be appreciated that in an alternate embodiment, a proportion of second liquid fuel relative to the first gaseous fuel in the fuel injection may be varied, the proportion based on the second fuel rail pressure of the second fuel. For example, the proportion of the second fuel may be increased as the second fuel rail pressure increases above a second threshold. That is, when the second fuel rail pressure is lower, the fuel injection may be shifted from injecting only the first fuel to injecting some second fuel and some first fuel, while when the second fuel rail pressure is higher, the fuel injection may be shifted from injecting only the first fuel to injecting relatively more of the second fuel and relatively less of the first fuel.

In this way, by temporarily alternating cylinder fuel injection between fuels in response to a possible flow restriction in a fuel line, temporary flow restrictions may be overcome without degrading vehicle fuel economy and exhaust emissions. By identifying and better distinguishing temporary fuel flow restrictions from persistent fuel flow restrictions, the issues may be better addressed and repair work may be requested only when needed. By increasing usage of an alternate fuel, vehicle fuel economy and performance may be improved.

Thus, the methods disclosed herein provide for a method of operating an engine coupled to a fuel system comprising: in response to a fuel rail pressure of a gaseous fuel falling below a threshold rail pressure while a fuel tank pressure of the gaseous fuel is above a threshold tank pressure, performing a mitigating action for a duration; and after the duration, resuming engine operation with the gaseous fuel. The method includes wherein the duration is based at least on ambient temperature conditions. The method includes wherein the fuel system includes only the gaseous fuel, and wherein the mitigating action includes limiting an aircharge delivered to the engine for the duration. The method also includes wherein the gaseous fuel is a first fuel, wherein the fuel system includes a second liquid fuel, and wherein the mitigating action includes, operating the engine with the second fuel for the duration.

The method further comprises indicating a temporary flow restriction in a fuel line of the gaseous fuel in response to the fuel rail pressure of the gaseous fuel being above the threshold rail pressure after the duration, while the fuel tank pressure of the gaseous fuel is above the threshold tank pressure without a refueling event; and indicating a persistent flow restriction in the fuel line of the gaseous fuel in response to the fuel rail pressure of the gaseous fuel being below the threshold rail pressure after the duration, while the fuel tank pressure of the gaseous fuel is above the threshold tank pressure without the refueling event.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising:
   responsive to a first fuel rail pressure below a rail threshold and a first fuel tank pressure of the first fuel above a tank threshold, alternating fuel injection to one or more engine cylinders from a first, gaseous fuel from a first fuel tank to a second, liquid fuel from a second fuel tank for a duration without refilling the first fuel tank, and then after the duration alternating back to the first fuel only if the first fuel rail pressure has risen above the rail threshold.

2. The method of claim 1, wherein the alternating fuel injection is further responsive to a second fuel rail pressure and a second fuel tank pressure of the second fuel.

3. The method of claim 1, wherein the alternating includes, injecting the first fuel until the first fuel rail pressure is below the rail threshold.

4. The method of claim 3, wherein the duration is responsive to ambient temperature, including a duration required to melt ice at a prevalent ambient temperature.

5. The method of claim 3, wherein injecting the second fuel includes, at least temporarily, automatically overriding a driver indicated preference for injection of the first fuel.

6. The method of claim 1, further comprising,
   in response to the first fuel rail pressure remaining below the threshold after the duration, injecting the second fuel.

7. The method of claim 6, further comprising,
   in response to the first fuel rail pressure being above the rail threshold after the duration, indicating a temporary flow restriction in a first fuel line via a first diagnostic code; and
   in response to the first fuel rail pressure being below the rail threshold after the duration, indicating a persistent flow restriction in the first fuel line via a second, different diagnostic code.

8. The method of claim 1, wherein the first fuel is a CNG fuel and the second fuel is a gasoline fuel.

9. A fuel system coupled to an engine, comprising:
   a first fuel tank configured to deliver a first gaseous fuel to an engine cylinder via a first fuel rail;
   a second fuel tank configured to deliver a second liquid fuel to the engine cylinder via a second fuel rail; and
   a control system with computer readable instructions for:
      while pressure in the first fuel tank is above a threshold pressure and while the first fuel tank is not refilled:
         temporarily increasing, for a duration, a proportion of the second fuel relative to the first fuel in a fuel injection to the engine cylinder responsive to a pressure of the first fuel rail being lower than a first threshold, the duration based on ambient temperature.

10. The fuel system of claim 9, wherein the proportion of the second fuel relative to the first fuel in the fuel injection is adjusted based on a pressure of the second fuel rail, the proportion being higher when the second fuel rail pressure is above a second threshold, and the proportion being lower when the second fuel rail pressure is below the second threshold.

11. The fuel system of claim 9, wherein the control system includes further instructions for,
   after the duration and if the first fuel rail pressure is above the first threshold, reducing the proportion of the second fuel relative to the first fuel; and
   after the duration and if the first fuel rail pressure is below the first threshold, maintaining or further increasing the proportion of the second fuel relative to the first fuel.

12. The fuel system of claim 9, wherein the first fuel includes CNG and wherein the second fuel includes gasoline.

13. A fuel-injected engine method, comprising:
   while CNG tank pressure is above a tank threshold without being refilled:
      switching, for a duration based on ambient temperature, from injecting CNG to injecting liquid gasoline responsive to CNG rail pressure below a rail threshold; and
      switching back to injecting CNG only if the CNG rail pressure has risen above the rail threshold; otherwise, maintaining injecting liquid gasoline.

14. The method of claim 13 further comprising setting a diagnostic code and limiting engine airflow in response to fuel rail pressure.

* * * * *